United States Patent
Perlade et al.

(10) Patent No.: US 9,540,719 B2
(45) Date of Patent: Jan. 10, 2017

(54) HOT-ROLLED STEEL SHEET AND ASSOCIATED PRODUCTION METHOD

(75) Inventors: Astrid Perlade, Le Ban-Saint-Martin (FR); Aurelie Milami, Thionville (FR); Florence Pechenot, Metz (FR); Erik Stenback, Metz (FR); Jean Marc Pipard, Vaux (FR); Farid E. Hassani, Crown Point, IN (US)

(73) Assignee: ARCELORMITTAL INVESTIGACION Y DESARROLLO SL, Sestao, Bizkaia (ES)

( * ) Notice: Subject to any disclaimer, the term of this patent is extended or adjusted under 35 U.S.C. 154(b) by 463 days.

(21) Appl. No.: 14/006,623

(22) PCT Filed: Mar. 23, 2012

(86) PCT No.: PCT/FR2012/000104
§ 371 (c)(1),
(2), (4) Date: May 8, 2014

(87) PCT Pub. No.: WO2012/127136
PCT Pub. Date: Sep. 27, 2012

(65) Prior Publication Data
US 2014/0230970 A1 Aug. 21, 2014

(30) Foreign Application Priority Data
Mar. 24, 2011 (WO) .................. PCT/FR2011/000173

(51) Int. Cl.
*B65G 45/10* (2006.01)
*B65G 45/24* (2006.01)
(Continued)

(52) U.S. Cl.
CPC ............... *C22C 38/58* (2013.01); *B65G 45/10* (2013.01); *B65G 45/24* (2013.01); *C21D 6/005* (2013.01);
(Continued)

(58) Field of Classification Search
CPC .................... B65G 45/10; B65G 45/24; C21D 8/04–8/0463; C21D 9/46; C21D 2211/002–2211/005; C22C 38/02–38/50; C22C 2/02–2/06
See application file for complete search history.

(56) References Cited

U.S. PATENT DOCUMENTS 6,364,968 B1 * 4/2002 Yasuhara ................. C21D 1/20
148/320
2002/0162613 A1 11/2002 Kashima et al.

FOREIGN PATENT DOCUMENTS

CN 1860247 A 11/2006
CN 101611163 A 12/2009
(Continued)

OTHER PUBLICATIONS

English translation of the International Search Report issued in connection with International Application No. PCT/FR2012/000104 on Sep. 24, 2012.
(Continued)

*Primary Examiner* — Colleen Dunn
(74) *Attorney, Agent, or Firm* — Davidson, Davidson & Kappel, LLC (57) ABSTRACT

A hot rolled steel sheet with a yield stress greater than 690 MPa and less than or equal to 840 MPa, with strength between 780 MPa and 950 MPa, elongation at failure greater than 10% and a hole expansion ratio (Ac) greater than or equal to 50% is described. Methods for the fabrication of the sheet are also described.

22 Claims, 1 Drawing Sheet

(51) Int. Cl.
*C21D 8/04* (2006.01)
*C22C 38/58* (2006.01)
*C21D 9/46* (2006.01)
*C22C 38/02* (2006.01)
*C22C 38/04* (2006.01)
*C22C 38/12* (2006.01)
*C22C 38/14* (2006.01)
*C23C 2/02* (2006.01)
*C23C 2/06* (2006.01)
*C21D 6/00* (2006.01)
*C22C 38/00* (2006.01)
*C22C 38/06* (2006.01)
*F27B 9/24* (2006.01)
*F27D 3/02* (2006.01)
*C21D 8/02* (2006.01)
*C22C 38/26* (2006.01)
*C22C 38/28* (2006.01)
*C22C 38/38* (2006.01)
*C22C 38/42* (2006.01)
*C22C 38/50* (2006.01)

(52) U.S. Cl.
CPC ............ *C21D 8/0263* (2013.01); *C21D 8/04* (2013.01); *C21D 8/041* (2013.01); *C21D 8/0405* (2013.01); *C21D 8/0426* (2013.01); *C21D 8/0463* (2013.01); *C21D 9/46* (2013.01); *C22C 38/001* (2013.01); *C22C 38/02* (2013.01); *C22C 38/04* (2013.01); *C22C 38/06* (2013.01); *C22C 38/12* (2013.01); *C22C 38/14* (2013.01); *C22C 38/26* (2013.01); *C22C 38/28* (2013.01); *C22C 38/38* (2013.01); *C22C 38/42* (2013.01); *C22C 38/50* (2013.01); *C23C 2/02* (2013.01); *C23C 2/06* (2013.01); *F27B 9/243* (2013.01); *F27D 3/026* (2013.01); *C21D 2211/002* (2013.01); *C21D 2211/003* (2013.01); *C21D 2211/005* (2013.01)

(56) References Cited

FOREIGN PATENT DOCUMENTS

| | | | |
|---|---|---|---|
| EP | 1 319 725 | | 6/2003 |
| EP | 1319725 | * | 6/2003 |
| EP | 2020451 | A1 | 2/2009 |
| JP | 2001226744 | A | 8/2001 |
| JP | 2001355043 | A | 12/2001 |
| JP | 2004307919 | A | 11/2004 |
| JP | 2010024547 | A | 2/2010 |
| WO | 2008045631 | A2 | 4/2008 |

OTHER PUBLICATIONS

English translation of the abstract of Document A09.

* cited by examiner

HOT-ROLLED STEEL SHEET AND ASSOCIATED PRODUCTION METHOD

This application is a national phase filing of International Application No. PCT/FR2012/000104, filed on Mar. 23, 2012, which claims priority to International Application No. PCT/FR2011/000173, filed on Mar. 24, 2011.

FIELD OF THE INVENTION

This invention relates principally to hot rolled steel sheet.
The invention further relates to methods that can be used to fabricate a steel sheet of the type described above.

BACKGROUND OF THE INVENTION

The need to reduce the weight of automotive vehicles and to increase safety has led to the production of high-strength steels.

Historically, the development of these types of steel began with the addition of alloy elements to primarily achieve precipitation hardening.

Later, "dual phase" steels were proposed which contain martensite in a ferrite matrix to obtain structural hardening.

To obtain superior strength levels combined with good deformation properties, "TRIP" (Transformation Induced Plasticity) steels have been developed, the microstructure of which contains a ferrite matrix containing bainite and residual austenite which, under the effect of a deformation such during a stamping operation, for example, is transformed into martensite.

Finally, to achieve mechanical strength greater than 800 MPa, multi-phase steels with a majority bainite structure have been proposed. These steels are used in industry, and in particular in the automobile industry, to manufacture structural components.

This type of steel is described in EP 2 020 451. To obtain an elongation at failure greater than 10% as well as mechanical strength greater than 800 MPa, the steels described in this publication, in addition to the known presence of carbon, contain manganese and silicon, molybdenum and vanadium. The microstructure of these steels essentially contains upper bainite (at least 80%) as well as lower bainite, martensite and residual austenite.

However, the fabrication of these steels is expensive on account of the presence of molybdenum and vanadium.

SUMMARY OF THE INVENTION

The object of the invention is therefore to make available a sheet, the fabrication costs of which are less than the fabrication costs of the sheet described in EP 2 020 451.

Moreover, certain automobile parts, e.g, bumper beams and suspension arms, are fabricated by shaping operations that combine different modes of deformation. Certain microstructural characteristics of the steel can turn out to be well suited to one mode of deformation but less well suited to another. Certain portions of the parts must exhibit high yield strength, while others must exhibit good suitability for the shaping of a cut edge.

This latter property is evaluated as described below: after a hole has been cut into a sheet, a tapered tool is used to expand the edges of this hole. It is during this operation that premature damage can be observed in the vicinity of the edges of the hole during the expansion, whereby this damage begins in the second-phase particles or at the interfaces between the different microstructural components in the steel.

As described in standard ISO 16630:2009, the hole expansion method includes measuring the initial diameter Di of the hole before stamping, then the final diameter Df of the hole after stamping, determined when through cracks are observed in the thickness direction of the sheet on the edges of the hole. The hole expansion ability Ac % is determined according to the following formula:

$$Ac\ \% = 100 \times \frac{(Df - Di)}{Di}.$$

Ac is therefore used to quantify the ability of a sheet to withstand stamping at the level of a cut orifice. According to this method, the initial diameter is 10 mm.

Under these conditions, an object of the invention is to make available a steel sheet, the hole expansion ratio Ac % of which is greater than or equal to 50%, for a thickness range likely to be obtained by hot rolling, e.g., from 1.5 to 4 mm.

An additional object of the invention is an uncoated or electro-galvanized or galvanized steel sheet. The composition and the mechanical characteristics of the steel must be compatible with the stresses and thermal cycles of the continuous hot dip galvanizing processes.

An additional object of the invention is a method for the fabrication of a steel sheet that does not require significant rolling forces, which makes it possible to fabricate the steel in a wide range of thicknesses.

An additional object of the invention is to make available a steel sheet which is relatively insensitive to the problems of springback encountered during cold stamping operations. For this purpose, the yield stress Re must not be greater than 840 MPa. The yield stress must be not less than or equal to 690 MPa to satisfy the weight-reduction requirements.

An additional object of the invention is a steel sheet that can be easily welded using conventional assembly methods.

Finally, an additional object of the invention is a hot rolled steel sheet with economical fabrication costs, which exhibits simultaneously a yield stress greater than 690 MPa and less than or equal to 840 MPa, mechanical strength between 780 MPa and 950 MPa, elongation at failure greater than 10% and a hole expansion ratio Ac % greater than or equal to 50%. A yield stress greater than 690 MPa is defined as a yield stress that is strictly greater than 690 MPa.

For this purpose, the invention teaches a hot rolled steel sheet, the chemical composition of which is as follows, whereby the contents are expressed in percent by weight:

$0.040\% \leq C \leq 0.065\%$
$1.4\% \leq Mn \leq 1.9\%$
$0.1\% \leq Si \leq 0.55\%$
$0.095\% \leq Ti \leq 0.145\%$
$0.025\% \leq Nb \leq 0.045\%$
$0.005\% \leq Al \leq 0.1\%$
$0.002\% \leq N \leq 0.007\%$
$S \leq 0.004\%$
$P < 0.020$
optionally
$Cr \leq 0.7\%$
$Cu \leq 0.1\%$
$Ni \leq 0.25\%$
$B \leq 0.003\%$
$Ca \leq 0.005\%$
$Mg \leq 0.005\%$ the remainder consisting of iron and the unavoidable processing impurities, the microstructure of which contains granular bainite, ferrite, cementite in an area percentage less than 1.5%, and carbonitrides of titanium and niobium, and the ratio between the grain size $D_L$ measured parallel to the rolling direction and the grain size $D_N$ measured perpendicular to the rolling direction is less than or equal to 1.4.

The sheet claimed by the invention can also have the optional characteristics listed below, considered individually or in combination:

the ratio between the grain size $D_L$ measured parallel to the rolling direction and the grain size $D_N$ measured perpendicular to the rolling direction is less than or equal to 1.3.

in a first variant of the invention, the chemical composition is as follows, whereby the contents are expressed in percent by weight:
0.045%≤C≤0.065%
1.6%≤Mn≤1.9%
0.1%≤Si≤0.55%
0.095%≤Ti≤0.125%
0.025%≤Nb≤0.045%
0.01%≤Al≤0.1%
0.002%≤N≤0.007%
S≤0.004%
P<0.020
optionally
Cu≤0.1%
Ni≤0.25%
B≤0.003%
Ca≤0.005%
Mg≤0.005%
whereby said composition does not include chromium.

In the first variant of the invention, the composition of the steel contains, expressed in percent by weight:
0.1%≤Si≤0.3% in a second variant of the invention, the chemical composition is as follows, the contents being expressed in percent by weight:
0.040%≤C≤0.065%
1.4%≤Mn≤1.9%
0.1%≤Si≤0.4%
0.095%≤Ti≤0.145%
0.025%≤Nb≤0.045%
0.01%≤Al≤0.1%
0.002%≤N≤0.007%
0.2%≤Cr≤0.7%
S≤0.004%
P<0.020
optionally
Cu≤0.1%
Ni≤0.25%
B≤0.003%
Ca≤0.005%
Mg≤0.005%
when the composition of the steel includes chromium, the chromium content is as follows: 0.4%≤Cr≤0.6%
the area percentage of the granular bainite is between 80% and 95% and the area percentage of the ferrite is less than 20%.
The density of titanium nitrides having an average size greater than 6 μm is less than or equal to 3/mm².
The composition of the steel contains, in percent by weight:
0.0005%≤Ca≤0.005% the composition of the steel contains, in percent by weight:
0.0005%≤Mg≤0.005%.

The invention further relates to a method for the production of the sheet described above.

This method is characterized in that a steel is obtained in the form of liquid metal having the following composition, whereby the contents are expressed in percent by weight:
0.040≤C≤0.065%
1.4%≤Mn≤1.9%
0.1%≤Si≤0.55%
0.095%≤Ti≤0.145%
0.025%≤Nb≤0.045%
0.005%≤Al≤0.1%
0.002%≤N≤0.007%
S≤0.004%
P<0.020
optionally
Cr≤0.7%
Cu≤0.1%
Ni≤0.25%
B≤0.003%
Mg≤0.005%
the remainder consisting of iron and unavoidable impurities, and in that a vacuum processing or with SiCa is performed; in the latter case the composition also includes the following, expressed in percent by weight
0.0005%≤Ca≤0.005%,
in that the quantities of titanium [Ti] and nitrogen [N] dissolved in the liquid metal satisfy the relation %[Ti]%[N]<6·10⁻⁴%²,
and that the steel is cast to obtain a cast semi-finished product,
and that said semi-finished product is optionally reheated to a temperature between 1160° C. and 1300° C., then
in that said semi-finished, cast product is hot rolled with a temperature at the end of rolling between 880° C. and 930° C., the reduction rate of the penultimate pass being less than 0.25, the rate of the final pass being less than 0.15, the sum of the two reduction rates being less than 0.37, the starting temperature at the beginning of the penultimate pass being less than 960° C., to obtain a hot-rolled product, then
in that said hot-rolled product is cooled at a rate of between 50 and 150° C./s to obtain a hot-rolled steel sheet,
and in that said sheet is coiled at a temperature between 470 and 625° C.

This method can also include, in a first variant of the invention, the following optional characteristics, considered individually or in combination:

the composition of the steel is as follows, the concentrations being expressed in percent by weight:
0.045%≤C≤0.065%
1.6%≤Mn≤1.9%
0.1%≤Si≤0.3%
0.025%≤Nb≤0.045%
0.095%≤Ti≤0.125%
0.01%≤Al≤0.1%
0.002%≤N≤0.007%
S≤0.004%
P<0.020
optionally
Cu≤0.1%
Ni≤0.25%
B≤0.003%
Mg≤0.005%
whereby said composition does not include chromium, if the composition does not include chromium, the sheet is coiled at a temperature between 515 and strictly 620° C.

the sheet is coiled at a temperature between 515 and 560° C., the sheet is pickled, then the pickled sheet is heated to a temperature between 600 and 750° C., then the pickled sheet is cooled at a rate of between 5 and 20° C./s, and the sheet obtained is coated with zinc in a suitable zinc bath.

The method claimed by the invention can also have, in a second variant of the invention, the following optional characteristics considered individually or in combination:

the composition of the steel is as follows, whereby the contents are expressed in percent by weight:

0.040%≤C≤0.065%
1.4%≤Mn≤1.9%
0.1%≤Si≤0.4%
0.095%≤Ti≤0.145%
0.025%≤Nb≤0.045%
0.005%≤Al≤0.1%
0.002%≤N≤0.007%
0.2%≤Cr≤0.7%
S≤0.004%
P<0.020
optionally
Cu≤0.1%
Ni≤0.25%
B≤0.003%
Ca≤0.005%
Mg≤0.005% and the sheet is coiled at a temperature between 470 and 580° C.

the composition of the steel contains in percent by weight:
0.4%≤Cr≤0.6% when the sum of the contents of Mn, Si and Cr is less than 2.35%, the sheet is coiled at a temperature between 520° C. and 580° C.

Figure 1:
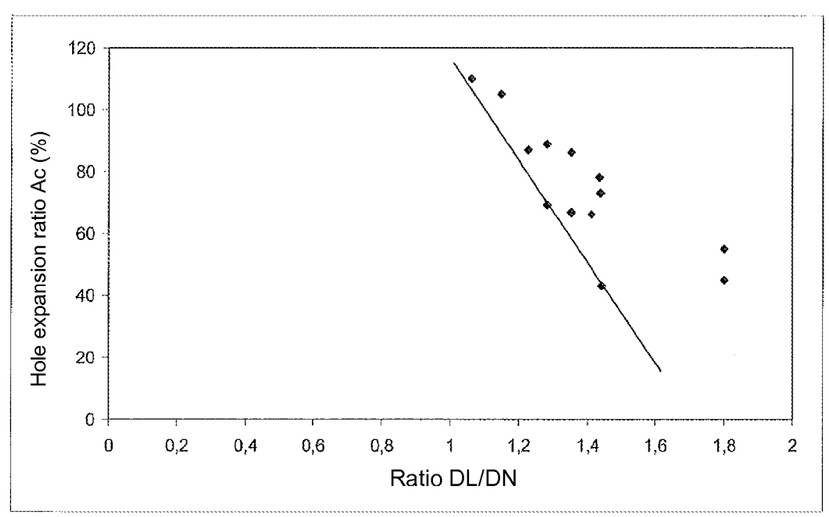
FIG. 1 illustrates a relationship between the ratio between the grain size $D_L$ measured parallel to the rolling direction and the grain size $D_N$ measured perpendicular to the rolling direction and the hole expansion ratio Ac.

Other characteristics and advantages of the invention are described below by way of example and with reference to the single accompanying figure which illustrates the curve of the hole expansion ratio Ac % as a function of the equi-axial character of the grains, which is observed on a polished and etched surface.

DETAILED DESCRIPTION OF THE INVENTION

The invention teaches that the carbon content by weight is between 0.040% and 0.065%. A carbon content in this range makes it possible to obtain simultaneously a high elongation at failure and mechanical strength greater than 780 MPa. For a higher carbon content, in particular above 0.095%, the suitability for welding tends to decrease (Table 1).

In addition, the maximum carbon content by weight is set at 0.065% which makes it possible to ensure the complete transformation of austenitie to granular bainite and thereby avoid the formation of martensite and austenite and the accompanying formation of hard second phases that limit the hole expansion ability. This maximum content therefore makes it possible to achieve a hole expansion ratio Ac % greater than or equal to 50%.

According to the invention, the manganese content by weight is between 1.4% and 1.9%. When present in these quantities, manganese contributes to the strength of the sheet and limits the formation of a central segregation band. It contributes to obtaining a hole expansion ratio Ac % greater than or equal to 50%.

An aluminum content by weight between 0.005% and 0.1% makes it possible to ensure the de-oxidation of the steel during its fabrication.

According to the invention, the chemical composition of the hot-rolled steel sheet also includes titanium and niobium. These two elements in particular give the steel the desired strength, the necessary hardening and the specified hole expansion ratio Ac %. These two elements each give the sheet the specific properties of strength, hardness and hole expansion ratio. It has been discovered in the context of this invention that these two elements must be present in specific content levels in the composition of the steel.

Titanium is more particularly present in the steel in a quantity between 0.095% and 0.145% by weight. Above 0.095%, the mechanical strength of 780 MPA is not achieved and below 0.145% there are risks of the precipitation of coarse titanium nitrides which can cause premature damage during the expansion of the hole. In fact, when nitrides larger than 6 μm are present, it has been found that they are one of the majority causes of cleavage from the matrix during the cutting and stamping steps.

In addition, the invention teaches that the nitrogen content by weight is between 0.002% and 0.007%. The nitrogen content must be below 0.007% to avoid a premature precipitation of nitrides in the liquid metal. Although the nitrogen content can be extremely low, its limit value is set at 0.002% so that the fabrication can be carried out under satisfactory economic conditions.

The niobium content by weight in the composition of the steel is between 0.025% and 0.045% and preferably between 0.025% and 0.035%. When present in a percent by weight greater than 0.025%, niobium hardens effectively via the formation of very fine carbonitrides. However, above a content of 0.045% by weight, the recrystallization of the austenite is retarded. The structure then contains a significant fraction of elongated grains, as a result of which it is no longer possible to achieve the specified hole expansion rate Ac %.

The combined addition of titanium and niobium in the specific proportions indicated above makes it possible to achieve optimal properties of hardening and expansion ability of the hole.

Thus the steel claimed by the invention does not include the expensive addition of molybdenum.

Optionally, the composition can include chromium in a quantity less than or equal to 0.7% to improve the surface quality, most particularly in a content between 0.4 and 0.6%. In one variant of the invention, however, the presence of chromium is not absolutely necessary, which has the advantage of eliminating the need for expensive additions. In an additional variant of the invention, the addition of chromium in a quantity between 0.2% and 0.7%, preferably between 0.4 and 0.6%, makes it possible to coil the steel at lower temperatures, as described in greater detail below.

The composition can also include the optional presence of copper in a quantity of up to 0.1% and/or nickel in a quantity of up to 0.25%.

To improve the surface quality, the composition can also optionally include boron in a quantity less than or equal to 0.003% and preferably between 0.0015 and 0.0025%.

The invention teaches that silicon is present in the chemical composition of the sheet in a content between 0.1% and 0.55% by weight.

The silicon retards the precipitation of the cementite. In the quantities defined according to the invention, the cementite precipitates in very small quantities, e.g., in an area percentage less than 1.5% and in a very fine form. This finer morphology of the cementite makes it possible to obtain a high hole expansion ability, e.g. greater than or equal to 50%.

The sulfur content of the steel claimed by the invention is less than 0.004% to limit the formation of sulfides, in particular manganese sulfides.

The low levels of sulfur and nitrogen in the composition of the sheet are beneficial in terms of the hole expansion ability.

The phosphorus content of the steel claimed by the invention is less than 0.020% to promote the hole expansion ability and weldability.

It can also be specified that the composition of the steel includes the presence of calcium in a percentage by weight of less than or equal to 0.005%, preferably between 0.0005% and 0.005% and/or the presence of magnesium in a percentage by weight less than or equal to 0.005%, preferably between 0.0005 and 0.005%.

These two elements make it possible to form fine oxides or oxysulfides of calcium and magnesium. These oxides or oxysulfides act as nucleants for a subsequent very fine precipitation of titanium nitrides/carbonitrides. The reduction in the size of the carbonitrides therefore makes it possible to achieve an improved hole expansion ability. The microstructure of the sheet according to the invention contains granular bainite.

Granular bainite must be distinguished from upper and lower bainite. The definition of granular bainite can be found in the article entitled *Characterization and Quantification of Complex Bainitic Microstructures in High and Ultra-High Strength Steels—Materials Science Forum Volume* 500-501, pages 387-394; November 2005.

As indicated in this article, the granular bainite that composes the microstructure of the sheet according to the invention is defined as having a significant proportion of highly disoriented adjacent grains and an irregular morphology of the grains.

According to the invention, cementite is present in low quantities, limited to an area percentage not exceeding 1.5%. The damage that occurs between the bainite matrix and the cementite which is significantly harder is therefore limited. This low content of cementite originates in particular from the addition of the silicon used and makes it possible to obtain a steel sheet with a hole expansion ratio Ac % greater than or equal to 50%.

The sheets can contain up to 20% ferrite in area percentage.

Finally, according to the invention, the sheet also contains carbonitrides of titanium and niobium.

The sheet claimed by the invention is free of martensite and austenite, which makes it possible to prevent the presence of hard second phases, the effect of which would be to limit the hole expansion ratio Ac %. The microstructure of the sheet claimed by the invention contains principally granular bainite and possibly ferrite and cementite in the proportions determined and indicated above. The sheet is precipitation hardened and is characterized by the absence of the hard second phases mentioned above.

Reference is made to FIG. 1 which illustrates the relationship between the ratio between the grain size $D_L$ measured parallel to the rolling direction and the grain size $D_N$ measured perpendicular to the rolling direction and the hole expansion ratio Ac.

The ratio $D_L/D_N$ is determined as follows: The microstructure is observed on a cut section that has been polished and etched using a reagent which is known in itself, by optical microscopy at magnifications ranging from approximately 500 to 1500× over a surface which comprises a statistically representative population of grains. Image analysis software, which is known in itself, EBSD (Electron Back Scattered Diffraction), for example, is used to determine the average grain sizes measured parallel ($D_L$) and perpendicular ($D_N$) to the rolling direction. The ratio $D_L/D_N$ therefore characterizes the average extension of the grains in the rolling direction, which is also called the equiaxial character.

As illustrated in FIG. 1, the inventors have shown that there is a relationship between the hole expansion ratio Ac % and the ratio $D_L/D_N$. The straight line plotted in FIG. 1 indicates the lower envelope of the experimental results and makes it possible to determine, at the level of the expansion of a given hole, the value of the ratio $D_L/D_N$ that must not be exceeded to achieve this given level. It has therefore been shown that to obtain a coefficient Ac greater than or equal to 50%, the ratio $D_L/D_N$ must be less than or equal to 1.4, which means that the grains must be relatively equiaxial. To obtain a hole expansion ratio Ac % greater than 65 or equal to 100%, the ratio $D_L/D_N$ must be respectively less than or equal to 1.3 or 1.1.

In addition, the area percentage of the granular bainite is between 80% and 95% and the area percentage of the ferrite is less than 20%.

To obtain an area percentage of cementite of less than 1.5%, the silicon content is between 0.1 and 0.55% by weight.

Tables 1, 2A, 2B and 2C below illustrate the influence of the chemical composition and the fabrication conditions of a hot-rolled steel sheet on the microstructure and the mechanical strength, the elongation at failure, the hole expansion ratio Ac % and the ratio $D_L/D_N$.

All these steel compositions have a phosphorus content less than 0.020% by weight.

These tables also provide information on the fabrication cost of the sheet, the ease of fabrication of the hot-rolled steel sheet in a thickness range from 1.5 to 4 millimeters, and the weldability of the sheet.

The coiling temperatures of the hot-rolled and cooled steel sheet are indicated for all the examples presented in these tables as well as for certain counterexamples.

These tables also indicate the more or less significant presence of "M-A" compounds, i.e. "Martensite-residual Austenite". On account of their intrinsic hardness (martensite) or their ability to form martensite under the influence of deformation (residual austenite), the presence of these compounds which combine martensite and residual austenite, in variable proportions is undesirable in terms of the requirement to obtain high values of the hole expansion ratios.

All the compositions and processing conditions of the sheet claimed by the invention are such that the density of TiN with an average size greater than or equal to 6 μm is less than or equal to 3/mm².

Table 1 specifically relates to examples in which the composition of the steel does not include chromium.

Counterexample 1 corresponds to a sheet described in publication EP 2 020 451. In this sheet, as explained above, the presence of vanadium and molybdenum results in excessive costs.

Counterexample 2 shows that in the absence of molybdenum and in the presence of vanadium, the sheet obtained has a maximum tensile strength which is too low.

This maximum tensile strength Rm can be increased by adding carbon and niobium (counterexample 3), but in this case the hole expansion ratio is insufficient.

In counterexample 4, a niobium content of 0.03% and a low titanium content once again result in a maximum tensile strength which is too low.

Counterexamples 2, 3 and 4 also have an excessive presence of the M-A compounds defined above.

In counterexamples 5 and 6, the niobium and titanium contents are high. It can be noted that with (counterexample 5) or without (counterexample 6) molybdenum, the hole expansion ratio is insufficient and the ratio $D_L/D_N$ is too high. In addition, for counterexample 5, high contents of niobium and molybdenum cause problems of dimensional feasibility.

Finally, counterexample 7 differs from counterexample 3 in that the composition does not include vanadium and includes a high carbon content. In this case, the result is insufficient weldability, an undesirable proportion of "M-A" compounds as well as an insufficient yield stress and hole expansion ratio.

Examples 1 to 3 are included in the framework of the invention for a silicon content between 0.1% and 0.55%.

On account of the absence of hardening elements (Mo in particular) and the limited niobium content, the steels claimed by the invention can be used for easy fabrication by hot rolling in a wide range of thicknesses.

Tables 2A, 2B and 2C relate specifically to compositions that include chromium in content levels between 0.2 and 0.7%.

The coiling temperatures of the hot rolled and cooled steel sheets are 500° C. and 550° C.

In counterexamples A and B, the manganese content is 1.296%. For these two counterexamples, it has been found that whether the coiling temperature is 500° C. or 550° C., the sheet does not have the required properties, in particular in terms of the maximum tensile strength.

In counterexamples C and D, the silicon content is 0.6%. For these two counterexamples, it has been found that whether the coiling temperature is 500° C. or 550° C., the sheet does not have the required properties, in particular on account of numerous "M-A" compounds.

The other results presented in Tables 2A, 2B and 2C are classified according to the increasing sum of the added contents of manganese, silicon and chromium.

Tests performed with a composition that is within the framework of the invention for a sum of the contents of Mn, Si and Cr of less than 2.35 and a coiling temperature of 500° C. produced unsatisfactory results, in particular in terms of maximum tensile strength.

When the sum of the contents of Mn, Si and Cr is greater than 2.35, the properties of the sheet obtained are satisfactory whether the coiling temperature is 500° C. or 550° C.

TABLE 1

| | Chemical composition (in %) | | | | | | | | | | |
|---|---|---|---|---|---|---|---|---|---|---|---|
| | C | Mn | Si | Al | S | Cr | Mo | Nb | Ti | V | N |
| Counterexample 1 | 0.076 | 1.661 | 0.22 | 0.03 | 0.003 | 0.408 | 0.307 | — | — | 0.154 | 0.007 |
| Counterexample 2 | 0.095 | 2.054 | 0.21 | 0.035 | 0.002 | 0.339 | — | — | — | 0.162 | 0.003 |
| Counterexample 3 | 0.125 | 2.067 | 0.204 | 0.038 | 0.001 | 0.402 | — | 0.031 | — | 0.164 | 0.004 |
| Counterexample 4 | 0.06 | 2.011 | 0.502 | 0.04 | 0.002 | 0.514 | — | 0.03 | 0.023 | — | 0.004 |
| Counterexample 5 | 0.05 | 1.66 | 0.227 | 0.035 | 0.003 | — | 0.145 | 0.067 | 0.09 | — | 0.006 |
| Counterexample 6 | 0.057 | 1.626 | 0.206 | 0.033 | 0.002 | — | — | 0.069 | 0.086 | — | 0.005 |
| Counterexample 7 | 0.095 | 1.943 | 0.482 | 0.04 | 0.002 | 0.505 | — | 0.028 | 0.021 | — | 0.005 |
| Example 1 * | 0.05 | 1.7 | 0.2 | 0.033 | 0.002 | — | — | 0.04 | 0.105 | — | 0.005 |
| Example 2 ** | 0.049 | 1.64 | 0.215 | 0.032 | 0.003 | — | — | 0.041 | 0.112 | — | 0.004 |
| Example 3 *** | 0.064 | 1.778 | 0.521 | 0.05 | 0.001 | — | — | 0.031 | 0.104 | — | 0.006 |

| | Analytic cost | Thickness feasibility | Weldability | Fraction of M-A islands | Yield stress Re (MPa) | Max. tensile strength Rm | Total elongation at failure | Hole expansion (ISO) method) | Grain elongation ratio DN/DL | | |
|---|---|---|---|---|---|---|---|---|---|---|---|
| Counterexample 1 | ● | ○ | ○ | ○ | 760 | 867 | 10 | 64 | ND | | |
| Counterexample 2 | ○ | ○ | ○ | ○ | 690 | 750 | 13.4 | ND | ND | ● | Poor |
| Counterexample 3 | ○ | ○ | ○ | ● | 765 | 847 | 16.6 | 33.3 | ND | ○ | Average |
| Counterexample 4 | ○ | ○ | ○ | ● | 674 | 730 | 18.1 | ND | ND | ○ | Good |
| Counterexample 5 | ● | ● | ○ | ○ | 836 | 878 | 13.4 | 45 | 1.8 | ND | Not Determined |
| Counterexample 6 | ○ | ○ | ○ | ○ | 813.5 | 820 | 13.5 | 43.1 | 1.44 | | |
| Counterexample 7 | ○ | ○ | ○ | ● | 688 | 966 | 12.8 | 21.8 | ND | | |

TABLE 1-continued

| | | | | | | | | | | |
|---|---|---|---|---|---|---|---|---|---|---|
| Example 1 * | ○ | ○ | ○ | ○ | 816.5 | 821 | 14.8 | 66.5 | 1.35 | * Coiling temp.: 590° C. |
| Example 2 ** | ○ | ○ | ○ | ○ | 818 | 824 | 14.4 | 78 | ND | ** Coiling temp.: 500° C. |
| Example 3 *** | ○ | ○ | ○ | ○ | 776 | 864 | 16.8 | 53 | ND | *** Coiling temp.: 578° C. |

TABLE 2A

Chemical Composition (in %)

| | C | Mn | Si | Al | S | Cr | Nb | Ti | N | Mn + Si + Cr |
|---|---|---|---|---|---|---|---|---|---|---|
| Counterexample A * | 0.049 | 1.296 | 0.209 | 0.03 | <0.001 | 0.616 | 0.033 | 0.102 | 0.004 | — |
| Counterexample B ** | 0.049 | 1.296 | 0.209 | 0.03 | <0.001 | 0.616 | 0.033 | 0.102 | 0.004 | — |
| Counterexample C * | 0.055 | 1.6 | 0.6 | 0.045 | <0.001 | 0.6 | 0.03 | 0.125 | 0.004 | — |
| Counterexample D ** | 0.055 | 1.6 | 0.6 | 0.045 | <0.001 | 0.6 | 0.03 | 0.125 | 0.004 | — |
| Example 1 * | 0.048 | 1.492 | 0.206 | 0.031 | <0.001 | 0.612 | 0.031 | 0.1 | 0.004 | 2.31 |
| Example 2 * | 0.048 | 1.501 | 0.207 | 0.031 | <0.001 | 0.614 | 0.032 | 0.1 | 0.005 | 2.322 |
| Example 3 ** | 0.056 | 1.78 | 0.207 | 0.038 | 0.002 | 0.405 | 0.03 | 0.108 | 0.005 | 2.392 |
| Example 4 * | 0.045 | 1.78 | 0.4 | 0.038 | 0.002 | 0.22 | 0.03 | 0.122 | 0.004 | 2.4 |
| Example 5 ** | 0.045 | 1.78 | 0.4 | 0.038 | 0.002 | 0.22 | 0.03 | 0.122 | 0.004 | 2.4 |

| | Analytic cost | Thickness feasibility | Weldability | Fraction of M-A islands | Yield Stress Re (MPa) | Max. tensile strength Rm (MPa) | Total elongation at failure | Hole expansion (ISO method) | | |
|---|---|---|---|---|---|---|---|---|---|---|
| Counterexample A* | ○ | ○ | ○ | ○ | 725 | 770 | 8 | 72 | | |
| Counterexample B ** | ○ | ○ | ○ | ○ | 725 | 769 | 16.3 | 100 | ● | Poor |
| Counterexample C* | ○ | ○ | ○ | ⊙ | 856 | 897 | 17.2 | 41 | ⊙ | Average |
| Counterexample D ** | ○ | ○ | ○ | ⊙ | 789 | 848 | 16.3 | 55 | ○ | Good |
| Example 1 * | ○ | ○ | ○ | ○ | 800 | 823 | 16.3 | 57 | ND | Not Determined |
| Example 2 ** | ○ | ○ | ○ | ○ | 760 | 863 | 16.3 | 55 | | |
| Example 3 ** | ○ | ○ | ○ | ○ | 751 | 796 | 16.1 | 58 | | * Coiling temp.: 550° C. |
| Example 4 * | ○ | ○ | ○ | ○ | 776 | 820 | 16.8 | 67 | | ** Coiling temp.: 500° C. |
| Example 5*** | ○ | ○ | ○ | ○ | 753 | 786 | 15.4 | 72 | | |

TABLE 2B

Chemical Composition (in %)

| | C | Mn | Si | Al | S | Cr | Nb | Ti | N | Mn + Si + Cr |
|---|---|---|---|---|---|---|---|---|---|---|
| Example 6 * | 0.043 | 1.77 | 0.4 | 0.038 | 0.02 | 0.293 | 0.03 | 0.121 | 0.004 | 2.463 |
| Example 7 ** | 0.043 | 1.77 | 0.4 | 0.038 | 0.02 | 0.293 | 0.03 | 0.121 | 0.004 | 2.463 |
| Example 8 * | 0.054 | 1.68 | 0.2 | 0.025 | 0.002 | 0.628 | 0.032 | 0.107 | 0.005 | 2.508 |
| Example 9 ** | 0.054 | 1.68 | 0.2 | 0.025 | 0.002 | 0.628 | 0.032 | 0.107 | 0.005 | 2.508 |
| Example 10 ** | 0.057 | 1.77 | 0.345 | 0.036 | 0.002 | 0.404 | 0.03 | 0.108 | 0.005 | 2.519 |
| Example 11 * | 0.055 | 1.77 | 0.347 | 0.033 | 0.002 | 0.404 | 0.03 | 0.108 | 0.005 | 2.521 |
| Example 12 * | 0.045 | 1.69 | 0.208 | 0.041 | <0.003 | 0.63 | 0.03 | 0.12 | 0.005 | 2.528 |
| Example 13 ** | 0.045 | 1.69 | 0.208 | 0.041 | <0.003 | 0.63 | 0.03 | 0.12 | 0.005 | 2.528 |

| | Analytic cost | Thickness feasibility | Weldability | Fraction of M-A islands | Yield stress Re (MPa) | Max. tensile strength Rm (MPa) | Total elongation at failure | Hole expansion (ISO method) | | |
|---|---|---|---|---|---|---|---|---|---|---|
| Example 6* | ○ | ○ | ○ | ○ | 783 | 829 | 16.8 | 67 | | |
| Example 7 ** | ○ | ○ | ○ | ○ | 739 | 783 | 14.9 | 58 | ● | Poor |

TABLE 2B-continued

| | | | | | | | | | | |
|---|---|---|---|---|---|---|---|---|---|---|
| Example 8 * | ○ | ○ | ○ | ○ | 764 | 827 | 17.7 | 51 | ◉ | Average |
| Example 9 ** | ○ | ○ | ○ | ○ | 741 | 794 | 13.8 | 87 | ○ | Good |
| Example 10 ** | ○ | ○ | ○ | ○ | 762 | 809 | 14.6 | 64 | ND | Not Determined |
| Example 11 ** | ○ | ○ | ○ | ○ | ND | 825 | 15 | 53 | | |
| Example 12 * | ○ | ○ | ○ | ○ | 785 | 826 | 16.6 | 72 | | * Coiling temp.: 550° C. |
| Example 13 ** | ○ | ○ | ○ | ○ | 741 | 793 | 15.2 | 82 | | ** Coiling temp.: 500° C. |

TABLE 2C

| | Chemical Composition (in %) | | | | | | | | | |
|---|---|---|---|---|---|---|---|---|---|---|
| | C | Mn | Si | Al | S | Cr | Nb | Ti | N | Mn + Si + Cr |
| Example 14 * | 0.045 | 1.76 | 0.4 | 0.035 | 0.002 | 0.393 | 0.03 | 0.12 | 0.004 | 2.553 |
| Example 15 ** | 0.045 | 1.76 | 0.4 | 0.035 | 0.002 | 0.393 | 0.03 | 0.12 | 0.004 | 2.553 |
| Example 16 ** | 0.055 | 1.6 | 0.4 | 0.045 | <0.001 | 0.6 | 0.03 | 0.125 | 0.004 | 2.6 |
| Example 17 * | 0.045 | 1.696 | 0.293 | 0.039 | <0.003 | 0.63 | 0.03 | 0.121 | 0.005 | 2.619 |
| Example 18 ** | 0.045 | 1.696 | 0.293 | 0.039 | <0.003 | 0.63 | 0.03 | 0.121 | 0.005 | 2.619 |
| Example 19 ** | 0.053 | 1.8 | 0.199 | 0.022 | 0.002 | 0.626 | 0.032 | 0.105 | 0.006 | 2.625 |
| Example 20 ** | 0.053 | 1.8 | 0.344 | 0.022 | 0.002 | 0.627 | 0.032 | 0.106 | 0.006 | 2.771 |

| | Analytic cost | Thickness feasibility | Weldability | Fraction of M-A islands | Yield stress Re (MPa) | Max. tensile strength Rm (MPa) | Total elongation at failure | Hole expansion (ISO method) | | |
|---|---|---|---|---|---|---|---|---|---|---|
| Example 14 * | ○ | ○ | ○ | ○ | 786 | 838 | 15.5 | 75 | ● | Poor |
| Example 15 ** | | | | | 754 | 799 | 14 | 69 | ◉ | Average |
| Example 16 ** | ○ | ○ | ○ | ○ | 803 | 840 | 15.5 | 72 | ○ | Good |
| Example 17 * | ○ | ○ | ○ | ○ | 824 | 864 | 14.2 | 62 | ND | Not Determined |
| Example 18 ** | ○ | ○ | ○ | ○ | 768 | 811 | 15 | 71 | | * Coiling temp.: 550° C. |
| Example 19 ** | ○ | ○ | ○ | ○ | 741 | 811 | 15.9 | 68 | | |

The fabrication method for a steel sheet defined above and with a content of silicon by weight between 0.1% and 0.55% includes the following steps:

A liquid steel is obtained having the composition indicated below, the contents being expressed by weight:
0.040%≤C≤0.065%
1.4%≤Mn≤1.9%
0.1%≤Si≤0.55%
0.095%≤Ti≤0.145%
0.025%≤Nb≤0.045%
0.01%≤Al≤0.1%
0.002%≤N≤0.007%
S≤0.004%
P<0.020% and optionally
Cr≤0.7%
Cu≤0.1%
Ni≤0.25%
B≤0.003%
Mg≤0.005%
the remainder consisting of iron and unavoidable impurities.

Titanium [Ti] is added to the liquid metal containing dissolved nitrogen [N] such that the quantities of titanium [Ti] and [N] dissolved in the liquid metal satisfy the expression %[Ti] % [N]<6·10$^{-4}$%$^2$.

The liquid metal is subjected to either a vacuum treatment or a silicon-calcium (SiCa) treatment, in which case the specified composition also contains calcium by weight such that 0.0005%≤Ca≤0.005%.

Under these conditions, the titanium nitrides do not precipitate prematurely in the form of large particles in the liquid metal, which would have the effect of reducing the hole expansion ability. The precipitation of the titanium occurs at a lower temperature in the form of uniformly distributed carbonitrides. This fine precipitation contributes to the hardening and refining of the microstructure.

The steel is then cast to obtain a cast semi-finished product. The casting is preferably done by continuous casting. The casting can very advantageously be done between counter-rotating rolls to obtain a cast semi-finished product in the form of thin slabs or thin strips. In effect, these casting methods cause a reduction in the size of the precipitates which is favorable to the hole expansion in the product obtained in the finished state.

The semi-finished product obtained is then heated to a temperature between 1160 and 1300° C. Below 1160° C., the specified mechanical tensile strength of 780 MPa is not achieved. Naturally, in the case of the direct casting of thin slabs, the stage of hot rolling the semi-finished products beginning at a temperature higher than 1160° C. can be done immediately after casting, e.g., without cooling of the semi-finished product to the ambient temperature, and therefore without the need to perform a reheating step. Then the cast semi-finished product is hot rolled at an end-of-rolling temperature between 880 and 930° C., the reduction rate of the penultimate pass being less than 0.25, the rate of the final pass being less than 0.15, the sum of the two reduction rates being less than 0.37, and the temperature of the start of rolling of the penultimate pass being less than 960° C., to obtain a hot rolled product.

During the final two passes, the rolling is therefore performed at a temperature below the non-recrystallization temperature which prevents the recrystallization of the austenite. The objective is therefore not to bring about an excessive deformation of the austenite during these final two passes.

These conditions make it possible to create the most equiaxial grain possible to satisfy the requirements relative to the hole expansion ratio Ac %.

After rolling, the hot rolled product is cooled at a rate between 50 and 150° C./s to obtain a hot rolled steel sheet. This mode of cooling is called "direct", e.g., it is performed in a single step without intermediate cooling stages.

Finally, the sheet obtained at a temperature between 470 and 625° C. is coiled. This temperature is important because a coiling temperature greater than 625° C. will result in a hole expansion ratio Ac % less than 50%.

In the case of the fabrication of uncoated sheet, the coiling temperature will be between 470 and 625° C. so that the precipitation is denser and the hardening as great as possible.

In the case of the fabrication of sheet intended to be subjected to a galvanization operation, the coiling temperature will be between 515 in 560° C., to compensate for the additional precipitation that occurs during the reheat treatment associated with the galvanization operation.

In this latter case, the coiled sheet will then be pickled and reheated to a temperature between 600 and 750° C. This sheet will then be cooled at a rate between 5 and 20° C./s, then coated with zinc in a suitable zinc bath.

In addition, when the composition does not contain chromium (Table 3), the coiling temperature is between 470° C. and strictly 620° C. The temperature of 620° C. is excluded in accordance with test B4 in Table 3. Preference is given to a coiling temperature between 525° C. and strictly 620° C.

If the composition includes chromium, the coiling temperature is preferably between 470° C. and 580° C. as illustrated in Tables 2A, 2B and 2C.

Other tests have also been performed on the steel containing 0.245%≤Si and a small quantity of Cr at 0.0299%, the composition of which is presented in Table 4 below. The table presents the yield stress Re, the strength Rm and the elongation at failure A. These tests were conducted on a slab reheated to 1240° C., hot rolled to an end-of-rolling temperature of 900° C., directly cooled at a rate of 70° C./s then coiled at a temperature between 440 and 540° C. and cooled to ambient temperature. The sheet was then reheated to a temperature between 580 and 720° C. before being hot-dip galvanized in a Zn bath.

For the test C1, the too low coiling temperature did not allow sufficient precipitation and hardening and the strength did not achieve 780 MPa. The same results were achieved in test C2, where the reheating temperature before galvanization was increased without achieving the desired strength.

For test C3, the hardening was excessive and the yield stress exceeded the specified level of 840 MPa.

TABLE 3

|  |  | Test No. | Slab reheat temperature (° C.) | End-of-rolling tempertature (° C.) | Coiling temperature (° C.) | Yield stress Re (MPa) | Maximum tensile strength Rm (MPa) | Total elongation at failure (%) | Hole expansion Ac (ISO Method) (%) |
|---|---|---|---|---|---|---|---|---|---|
| Effect of reheat T | Composition B | B1 | 1250 | 900 | 500 | 768 | 784 | 16.4 | 93 |
|  | Composition B | B2 | 1150 | 900 | 500 | 672 | 703 | 18.1 | 112 |
| Effect of coiling T | Composition A | A1 | 1240 | 900 | 650 | 824 | 833 | 15.3 | 34 |
|  | Composition A | A2 | 1240 | 900 | 560 | 836.5 | 847 | 14.5 | 50 |
|  | Composition C | C1 | 1250 | 900 | 500 | 742 | 774 | 14.8 | 94 |
|  | Composition B | B3 | 1240 | 900 | 650 | 821.5 | 833.5 | 15.1 | 47 |
|  | Composition B | B4 | 1240 | 900 | 620 | 877 | 887.5 | 14.4 | 46 |
|  | Composition B | B5 | 1250 | 900 | 500 | 768 | 784 | 16.4 | 93 |

|  | C | Mn | Si | Al | Nb | Ti | N | S | P |
|---|---|---|---|---|---|---|---|---|---|
| Composition A | 0.049 | 1.64 | 0.215 | 0.032 | 0.041 | 0.112 | 0.004 | 0.003 | 0.018 |
| Composition B | 0.049 | 1.63 | 0.49 | 0.032 | 0.04 | 0.11 | 0.004 | 0.002 | 0.018 |
| Composition C | 0.051 | 1.66 | 0.21 | 0.006 | 0.04 | 0.115 | 0.002 | 0.002 | 0.015 |

In Table 3 below, the slab reheat temperature is varied and/or the coiling temperature for three sheets with different chemical compositions, one containing 0.215%≤Si≤(composition A), the second 0.490%≤Si≤(composition B) and the third 0.21% Si (composition C).

All the steel sheets claimed by the invention were rolled with a reduction rate of 0.15 in the penultimate rolling pass and a reduction rate of 0.07 in the final rolling pass, the cumulative deformation of these two passes being 0.22. At the conclusion of the hot rolling, therefore, the austenite obtained is little deformed.

In the case of the steel with compositions A and B, when the coiling temperature is too high (650° C., tests A1 and B3), the hole expansion ratio Ac is significantly below 50%.

In the case of the steel with composition B, when the slab reheat temperature is only 1150° C. (test B2), the specified mechanical strength of 780 MPa is not achieved.

TABLE 4

| Test No. | Coiling temperature (° C.) | Reheat temperature prior to galvanization (° C.) | Yield stress Re (MPa) | Mechanical strength Rm (MPa) | A (%) |
|---|---|---|---|---|---|
| C1 | 440 | 580 | 695 | 765 | 12.4 |
| C2 | 440 | 630 | 708 | 774 | 8.5 |
| C3 | 500 | 720 | 842 | 888 | 12.4 |
| C4 | 540 | 660 | 771 | 824 | 14 |

TABLE 4-continued

| C | Si | Mn | P | S | Cr |
|---|----|----|----|---|----|
| 0.0528 | 0.245 | 1.791 | 0.0114 | 0.0015 | 0.0299 |

| Ni | Al | Cu | Nb | Ti | N |
|----|----|----|----|----|---|
| 0.0248 | 0.0359 | 0.0295 | 0.0286 | 0.0995 | 0.007 |

The invention claimed is:

1. A hot-rolled steel sheet with an elastic limit greater than 690 MPa and less than or equal to 840 MPa, with a strength between 780 MPa and 950 MPa, an elongation at failure greater than 10% and a hole expansion ratio (Ac) greater than or equal to 50%, the chemical composition of which contains, whereby the contents are expressed in percent by weight:
   $0.040\% \leq C \leq 0.065\%$,
   $1.4\% \leq Mn \leq 1.9\%$,
   $0.1\% \leq Si \leq 0.55\%$,
   $0.095\% \leq Ti \leq 0.145\%$,
   $0.025\% \leq Nb \leq 0.045\%$,
   $0.005\% \leq Al \leq 0.1\%$,
   $0.002\% \leq N \leq 0.007\%$,
   $S \leq 0.004\%$, and
   $P < 0.020$,
   the remainder consisting of iron and unavoidable impurities resulting from processing, the microstructure of which contains cementite in an area percentage of less than 1.5%, granular bainite, ferrite, and carbonitrides of titanium and niobium,
   whereby the density of titanium nitrides of average size greater than 6 μm is less than or equal to 3/mm², and
   a ratio between the grain size $D_L$ measured parallel to the rolling direction and a grain size $D_N$ measured perpendicular to the rolling direction is less than or equal to 1.4.

2. The steel sheet of claim 1, wherein the ratio between the grain size $D_L$ measured parallel to the rolling direction and the grain size $D_N$ measured perpendicular to the rolling direction is less than or equal to 1.3.

3. The steel sheet of claim 1, wherein the chemical composition contains, whereby the contents are expressed in percent by weight:
   $0.045\% \leq C \leq 0.065\%$,
   $1.6\% \leq Mn \leq 1.9\%$,
   $0.1\% \leq Si \leq 0.55\%$,
   $0.095\% \leq Ti \leq 0.125\%$,
   $0.025\% \leq Nb \leq 0.045\%$,
   $0.01\% \leq Al \leq 0.1\%$,
   $0.002\% \leq N \leq 0.007\%$,
   $S \leq 0.004\%$, and
   $P < 0.020\%$,
   whereby said composition does not include chromium.

4. The steel sheet of claim 1, wherein the chemical composition of the steel contains, expressed in percent by weight:
   $0.1\% \leq Si \leq 0.3\%$.

5. The steel sheet of claim 1, wherein the chemical composition contains, whereby the contents are expressed in percent by weight:
   $0.040\% \leq C \leq 0.065\%$,
   $1.4\% \leq Mn \leq 1.9\%$,
   $0.1\% \leq Si \leq 0.4\%$,
   $0.095\% \leq Ti \leq 0.145\%$,
   $0.025\% \leq Nb \leq 0.045\%$,
   $0.01\% \leq Al \leq 0.1\%$,
   $0.002\% \leq N \leq 0.007\%$,
   $0.2\% \leq Cr \leq 0.7\%$,
   $S \leq 0.004\%$, and
   $P < 0.020\%$.

6. A steel sheet of claim 1, wherein the chemical composition of the steel contains, expressed in percent by weight:
   $0.4\% \leq Cr \leq 0.6\%$.

7. The steel sheet of claim 1, wherein the area percentage of the granular bainite is between 80% and 95% and the area percentage of the ferrite is less than 20%.

8. The steel sheet of claim 1, wherein the chemical composition of the steel contains, expressed in percent by weight:
   $0.0005\% \leq Ca \leq 0.005\%$.

9. The steel sheet of claim 1, wherein the chemical composition of the steel contains, expressed in percent by weight:
   $0.0005\% \leq Mg \leq 0.005\%$.

10. A method for the fabrication of a hot rolled steel sheet with an elastic limit greater than 690 MPa and less than or equal to 840 MPa, a strength between 780 MPa and 950 MPa and an elongation at failure greater than 10%, comprising:
   obtaining a liquid steel in a liquid metal form, the composition of which contains, expressed in percent by weight:
   $0.040\% \leq C \leq 0.065\%$,
   $1.4\% \leq Mn \leq 1.9\%$,
   $0.1\% \leq Si \leq 0.55\%$,
   $0.095\% \leq Ti \leq 0.145\%$,
   $0.025\% \leq Nb \leq 0.045\%$,
   $0.005\% \leq Al \leq 0.1\%$,
   $0.002\% \leq N \leq 0.007\%$,
   $S \leq 0.004\%$, and
   $P < 0.020\%$,
   the remainder consisting of iron and unavoidable impurities,
   subjecting the liquid steel to a vacuum treatment or a SiCa treatment, provided that if the liquid steel is subjected to the SiCa treatment the composition contains $0.0005\% \leq Ca \leq 0.005\%$, expressed in percent by weight, wherein the quantities of titanium [Ti] and nitrogen [N] dissolved in the liquid steel satisfy the relation $\%[Ti] \cdot \%[N] < 6 \cdot 10^{-4} \%^2$,
   casting the liquid steel to obtain a cast semi-finished product and optionally reheating said semi-finished product to a temperature between 1160° C. and 1300° C., then
   hot rolling said cast semi-finished product with a temperature at the end of rolling between 880° C. and 930° C., a reduction rate of the penultimate pass being less than 0.25, the rate of the final pass being less than 0.15, the sum of the two reduction rates being less than 0.37, the starting temperature at the beginning of the penultimate pass being less than 960° C., to obtain a hot-rolled product, then
   cooling said hot-rolled product at a rate of between 50 and 150° C./s to obtain a hot-rolled steel sheet, and
   coiling said hot-rolled sheet at a temperature between 470 and 625° C.

11. The method of claim 10, wherein the composition of the liquid steel contains the following elements, whereby the contents are expressed in percent by weight:
   $0.045\% \leq C \leq 0.065\%$,
   $1.6\% \leq Mn \leq 1.9\%$,
   $0.1\% \leq Si \leq 0.3\%$,
   $0.095\% \leq Ti \leq 0.125\%$,
   $0.025\% \leq Nb \leq 0.045\%$, 0.01%≤Al≤0.1%,
0.002%≤N≤0.007%,
S≤0.004%, and
P<0.020%,
whereby said composition does not include chromium.

12. The method of claim 10, wherein the hot-rolled sheet is coiled at a temperature between 515° C. and strictly 620° C.

13. The method of claim 10, wherein the hot-rolled sheet is coiled at a temperature between 515 and 560° C.,
the sheet is pickled,
the pickled sheet is heated to a temperature between 600 and 750° C., and then is cooled at a rate of between 5 and 20° C./s,
and the sheet obtained is coated with zinc in a zinc bath.

14. The method of claim 10, wherein the liquid steel contains, expressed in percent by weight:
0.040%≤C≤0.065%,
1.4%≤Mn≤1.9%,
0.1%≤Si≤0.4%,
0.095%≤Ti≤0.145%,
0.025%≤Nb≤0.045%,
0.005%≤Al≤0.1%,
0.002%≤N≤0.007%,
0.2%≤Cr≤0.7%,
S≤0.004%, and
P<0.020%,
and the hot-rolled sheet is coiled at a temperature between 470 and 580° C.

15. The method of claim 10, wherein the composition of the liquid steel contains, expressed in percent by weight:
0.4%≤Cr≤0.6%.

16. The method of claim 14, wherein the sum of the Mn, Si and Cr contents is less than 2.35%, and the hot-rolled sheet is coiled at a temperature between 520° C. and 580° C.

17. The hot-rolled steel sheet of claim 1, wherein the composition of the steel contains, expressed in percent by weight:
Cr≤0.7%.

18. The hot-rolled steel sheet of claim 1, wherein the composition of the steel contains, expressed in percent by weight:
Cu≤0.1%.

19. The hot-rolled steel sheet of claim 1, wherein the composition of the steel contains, expressed in percent by weight:
Ni≤0.25%.

20. The hot-rolled steel sheet of claim 1, wherein the composition of the steel contains, expressed in percent by weight:
B≤0.003%.

21. The hot-rolled steel sheet of claim 1, wherein the composition of the steel contains, expressed in percent by weight:
Ca≤0.005%.

22. The hot-rolled steel sheet of claim 1, wherein the composition of the steel contains, expressed in percent by weight:
Mg≤0.005%.

* * * * *